(12) United States Patent
Levsen (10) Patent No.: US 10,569,441 B2
(45) Date of Patent: Feb. 25, 2020

(54) ROTARY KNIFE PROVIDING MATERIAL REMOVAL VIA SUCTION (71) Applicant: Hantover, Inc., Overland Park, KS (US)

(72) Inventor: Clark A. Levsen, Shawnee, KS (US)

(73) Assignee: Hantover, Inc., Overland Park, KS (US)

(*) Notice: Subject to any disclaimer, the term of this patent is extended or adjusted under 35 U.S.C. 154(b) by 194 days.

(21) Appl. No.: 15/785,196

(22) Filed: Oct. 16, 2017

(65) Prior Publication Data

US 2019/0111581 A1  Apr. 18, 2019

(51) Int. Cl.
*B26D 7/18* (2006.01)
*A22C 17/00* (2006.01)
*B26B 25/00* (2006.01)

(52) U.S. Cl.
CPC ........ *B26D 7/1863* (2013.01); *A22C 17/0006* (2013.01); *B26B 25/002* (2013.01)

(58) Field of Classification Search
CPC .......... B26D 7/00; B26D 7/18; B26D 7/1845; B26D 7/1854; B26D 7/1863; B26B 25/00; B26B 25/002
See application file for complete search history.

(56) References Cited

U.S. PATENT DOCUMENTS

| | | | | |
|---|---|---|---|---|
| 4,439,924 A * | 4/1984 | Bettcher | ............... | B26B 25/002 30/276 |
| 4,516,323 A * | 5/1985 | Bettcher | ............... | B26B 25/002 30/276 |
| 4,679,322 A * | 7/1987 | Hunts | ..................... | B26B 19/44 30/133 |
| 5,129,467 A * | 7/1992 | Watanabe | .......... | B23Q 11/0046 173/217 |
| 5,377,411 A * | 1/1995 | Andriotis | ................ | B26B 19/44 30/133 |
| 5,664,332 A * | 9/1997 | Whited | ................. | B26B 25/002 30/276 |
| 6,013,079 A * | 1/2000 | Salam | .................. | B23D 59/006 606/176 |
| 6,219,922 B1 * | 4/2001 | Campbell | ............ | B23D 59/006 30/124 |
| 6,233,831 B1 * | 5/2001 | Iida | ...................... | B23D 59/006 30/124 |
| 6,857,191 B2 | 2/2005 | Whited | | |
| D513,161 S * | 12/2005 | Chilton | ........................... | D8/70 |
| 7,107,887 B2 | 9/2006 | Whited | | |
| 7,526,866 B2 * | 5/2009 | Schnell | ................ | B23D 59/006 144/252.1 |
| 7,908,951 B2 * | 3/2011 | Bohne | .................. | B23D 59/006 83/100 |
| 8,037,611 B2 | 10/2011 | Levsen | | |
| 8,281,493 B2 | 10/2012 | Levsen | | |

(Continued)

*Primary Examiner* — Jason Daniel Prone
*Assistant Examiner* — Richard D Crosby, Jr.
(74) *Attorney, Agent, or Firm* — Hovey Williams LLP (57) ABSTRACT

A vacuum rotary knife is fluidly connectable to a vacuum source conduit. The rotary knife includes an annular blade and a knife head. The knife head supports the blade for rotation about a rotational axis. The knife head presents a vacuum port fluidly connectable to the conduit. The vacuum port is spaced from the blade such that the knife head defines a suction pathway extending between the blade and the vacuum port.

14 Claims, 9 Drawing Sheets

(56) References Cited

U.S. PATENT DOCUMENTS

| | | | | |
|---|---|---|---|---|
| 8,726,524 | B2* | 5/2014 | Whited | A22B 5/165 30/276 |
| 8,739,416 | B2* | 6/2014 | Mascari | A22B 5/165 30/276 |
| 8,893,391 | B2* | 11/2014 | Levsen | A22C 17/12 30/276 |
| D719,806 | S * | 12/2014 | Wiedemann | D8/70 |
| 8,950,076 | B2* | 2/2015 | Whited | A22B 5/165 30/276 |
| 9,321,183 | B2* | 4/2016 | Steele | B26B 25/002 |
| 9,452,541 | B2* | 9/2016 | Mascari | B26B 25/002 |
| 9,579,810 | B2* | 2/2017 | Mascari | B26B 25/002 |
| 9,999,986 | B2* | 6/2018 | Mascari | B26D 7/18 |
| 10,124,500 | B2* | 11/2018 | Whited | B26B 25/00 |
| 2004/0088864 | A1* | 5/2004 | Whited | B26B 25/002 30/123 |
| 2007/0283574 | A1* | 12/2007 | Levsen | A22B 5/165 30/276 |
| 2008/0098605 | A1* | 5/2008 | Whited | B26B 25/002 30/276 |
| 2015/0224666 | A1* | 8/2015 | Lin | B26D 7/1863 83/100 |
| 2019/0111581 | A1* | 4/2019 | Levsen | B26D 7/1863 |

* cited by examiner

ROTARY KNIFE PROVIDING MATERIAL REMOVAL VIA SUCTION

BACKGROUND

1. Field

The present invention relates generally to powered knives, such as knives used in meat processing facilities. More specifically, embodiments of the present invention concern a vacuum rotary knife that is fluidly connectable to a vacuum source.

2. Discussion of Prior Art

Rotary knives are commonly used in meat processing to dress an animal carcass. The process of dressing the carcass normally involves the removal of meat and fat from various bones as well as cutting bones and other carcass material. Rotary knives are configured to process the animal carcass with great efficiency. Conventional rotary knives include a housing and a blade assembly with an endless blade. Although rotary knives are efficient at cutting through carcass material, severed material can accumulate such that the material obscures the area of the carcass where the knife is being used.

Some prior art rotary knives are constructed so that a vacuum source can be attached to the head of the knife via a suction line. The suction line is provided at the knife head to remove severed carcass material as it is being produced by the knife. Moreover, some vacuum rotary knives are specifically designed to cut and remove material, such as the spinal cord, in a single operation.

However, conventional rotary knives with vacuum lines have a number of deficiencies. For instance, prior art knife heads, which are attached to the suction line, have complex and heavy constructions, rendering conventional knives cumbersome and fatiguing to use. Additionally, conventional knife head designs do not efficiently supply suction for drawing severed material through the knife head and into the suction line.

SUMMARY

The following brief summary is provided to indicate the nature of the subject matter disclosed herein. While certain aspects of the present invention are described below, the summary is not intended to limit the scope of the present invention.

Embodiments of the present invention provide a vacuum rotary knife that does not suffer from the problems and limitations of the prior art rotary knives set forth above.

A first aspect of the present invention concerns a vacuum rotary knife fluidly connectable to a vacuum source conduit. The rotary knife broadly includes an annular blade and a knife head. The knife head supports the blade for rotation about a rotational axis. The knife head presents a vacuum port fluidly connectable to the conduit. The vacuum port is spaced from the blade such that the knife head defines a suction pathway extending between the blade and the vacuum port. The suction pathway is at least substantially devoid of any openings.

A second aspect of the present invention concerns a vacuum rotary knife fluidly connectable to a vacuum source conduit. The rotary knife broadly includes a knife body, an annular blade, a knife head, and a plurality of fasteners. The knife head supports the blade on the knife body for rotation about a rotational axis. The knife head presents a vacuum port fluidly connectable to the conduit. The vacuum port is spaced from the blade such that the knife head defines a suction pathway extending between the blade and the vacuum port. The fasteners secure the knife head to the knife body. Each fastener presents a fastener axis along which the fastener shifts when securing the knife head to the knife body. The fasteners are located such that the fastener axes are spaced outside the suction pathway.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 1-5 and 7, a vacuum rotary knife 20 is constructed in accordance with a preferred embodiment of the present invention. The rotary knife 20 is preferably configured for use in a meat processing operation to dress an animal carcass. The knife 20 is most preferably designed to remove spinal cord tissue, although the principles of the present invention are not limited to this application.

As explained below, the rotary knife 20 includes a rotating blade for severing carcass material. At the same time, a vacuum system induces a suction air flow F through the knife 20 to draw severed carcass material away from the blade. Again, the knife 20 can be used in virtually any meat processing application without departing from the scope of the present invention. The rotary knife 20 preferably includes a knife body 22, a knife head 24, a powered drive 26, and a rotating blade assembly 28.

The powered drive 26 is configured to spin an annular blade 30 of the blade assembly 28. The drive 26 preferably includes a motor (not shown), a drive pinion 32, and a drive shaft 34 operably mounted in the knife body 22. Although the motor preferably comprises a pneumatic motor powered by a compressed air source (not shown), the knife 20 could include an alternative motor, such as an electric or hydraulic motor. Furthermore, the motor need not be mounted within the knife body 22. For example, it is within the ambit of the present invention to locate the motor remotely and couple a flexible drive shaft to the body. As will be explained below, the drive pinion 32 is mounted in driving engagement with the annular blade 30 and rotates about a drive axis A1 (see FIG. 4).

Still referring to FIGS. 1-5 and 7, the knife body 22 provides a handle to grasp and position the rotary knife 20 during operation. The illustrated knife body 22 preferably includes a grip housing 36, an extension housing 38, and a nut 40 that secures the housings 36,38 to one another.

The depicted knife body 22 further includes a head support 42 and a lock collar 44. The lock collar 44 can be threaded into a locking condition where the lock collar 44 frictionally engages the head support 42 to restrict relative rotation between the extension housing 38 and the head support 42. Thus, in the locking condition, the lock collar 44 adjustably secures the extension housing 38 and the head support 42 relative to one another. Similarly, the lock collar 44 can be threaded out of the locking condition so as to permit relative rotation between the extension housing 38 and the head support 42.

The head support 42 operably receives the knife head 24. The head support 42 presents a bore 46 and a socket 48 that receive a bushing 50 and the drive pinion 32 (see FIGS. 4, 6, and 7). The bushing 50 rotatably supports the drive pinion 32 and a corresponding end of the drive shaft 34 for rotation within the knife body 22 about the drive axis A1. The head support 42 presents an end face 52 that is generally perpendicular to the drive axis A1 (see FIG. 4). The head support 42 further presents a side surface 54 that extends generally parallel to the drive axis A1 (see FIG. 10). As will be discussed below, the knife head 24 is configured to be mounted to the end face 52 and the side surface 54 of the head support 42.

The illustrated knife body configuration preferably permits angular adjustability of the head support 42 relative to the grip housing 36 and the extension housing 38 about the drive axis A1. Preferably, the extension housing 38 and the head support 42 present male and female threaded sections, respectively, that are threadably connected to each other at a threaded connection 55a (see FIGS. 3-5). Thus, the threaded connection 55a permits relative rotation between the extension housing 38 and the head support 42 about the axis A1 (e.g., to allow angular adjustment of the head support 42 relative to the extension housing 38 and the grip housing 36).

Figure 1:
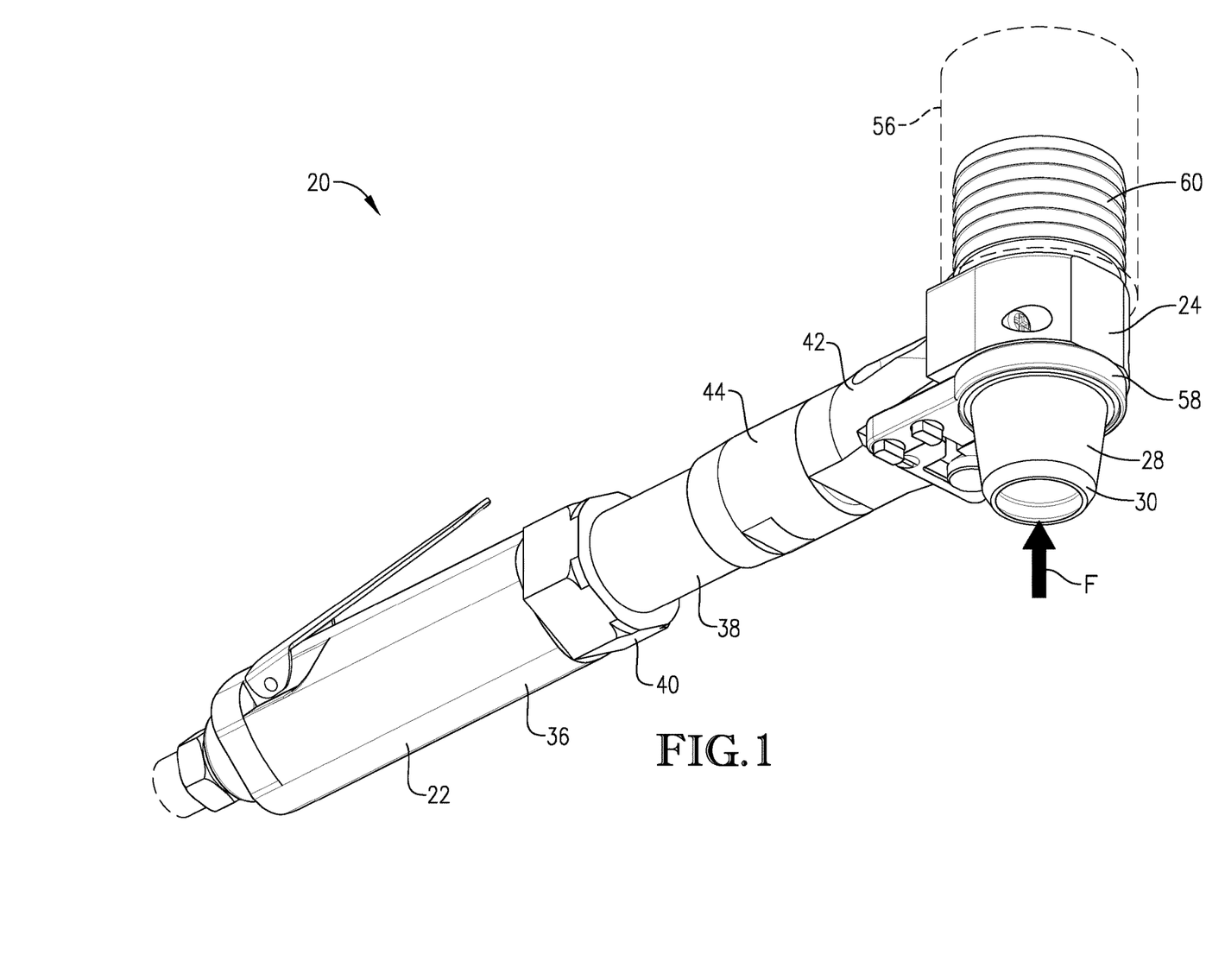
FIG. 1 is a lower perspective of a vacuum rotary knife constructed in accordance with a preferred embodiment of the present invention.
Figure 2:
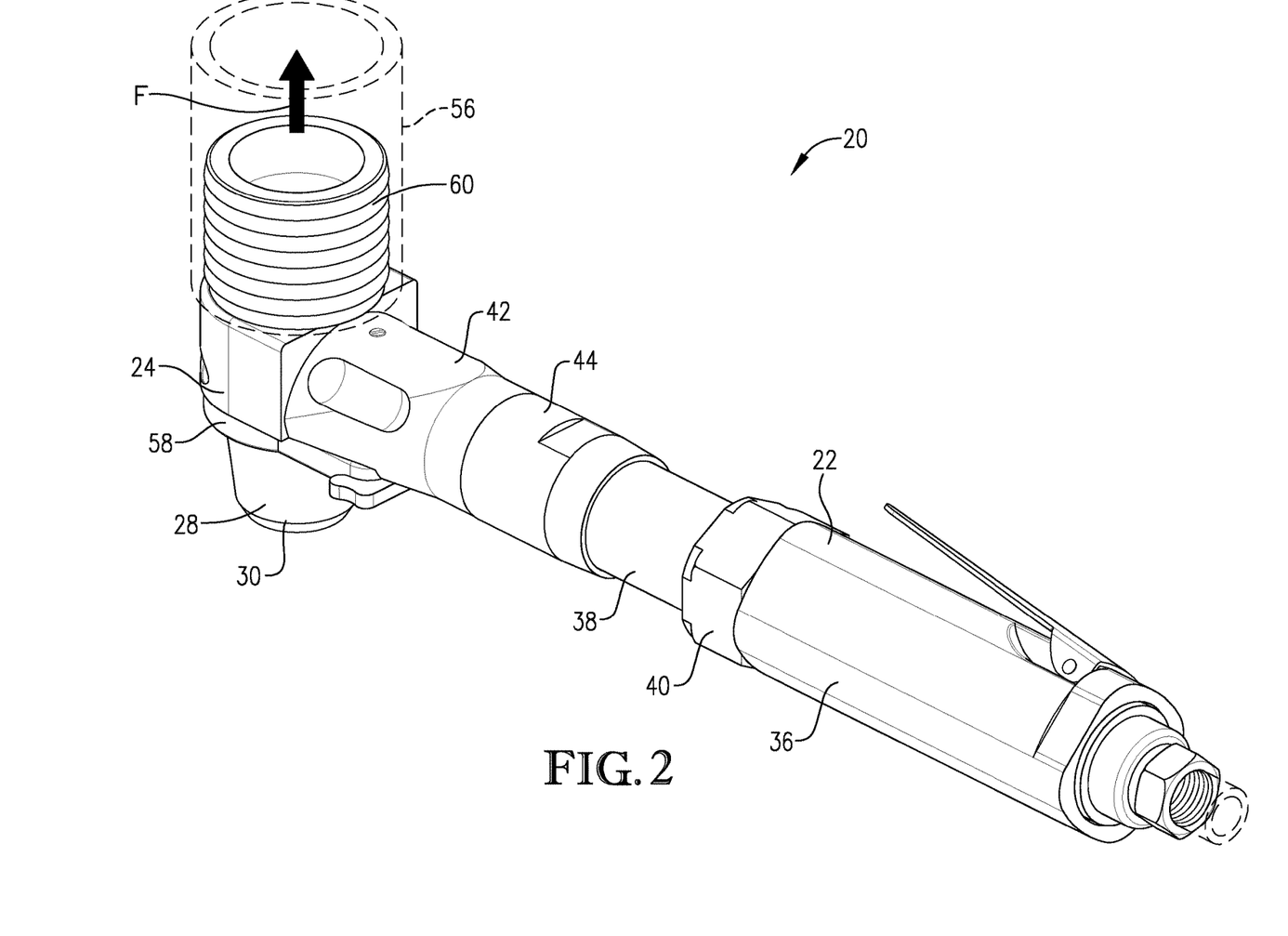
FIG. 2 is an upper perspective of the vacuum rotary knife shown in FIG. 1, with the rotary knife including a knife body, a knife head, a powered drive, and a rotating blade assembly, and showing an extension, head support, and locking collar of the knife body.
Figure 3:
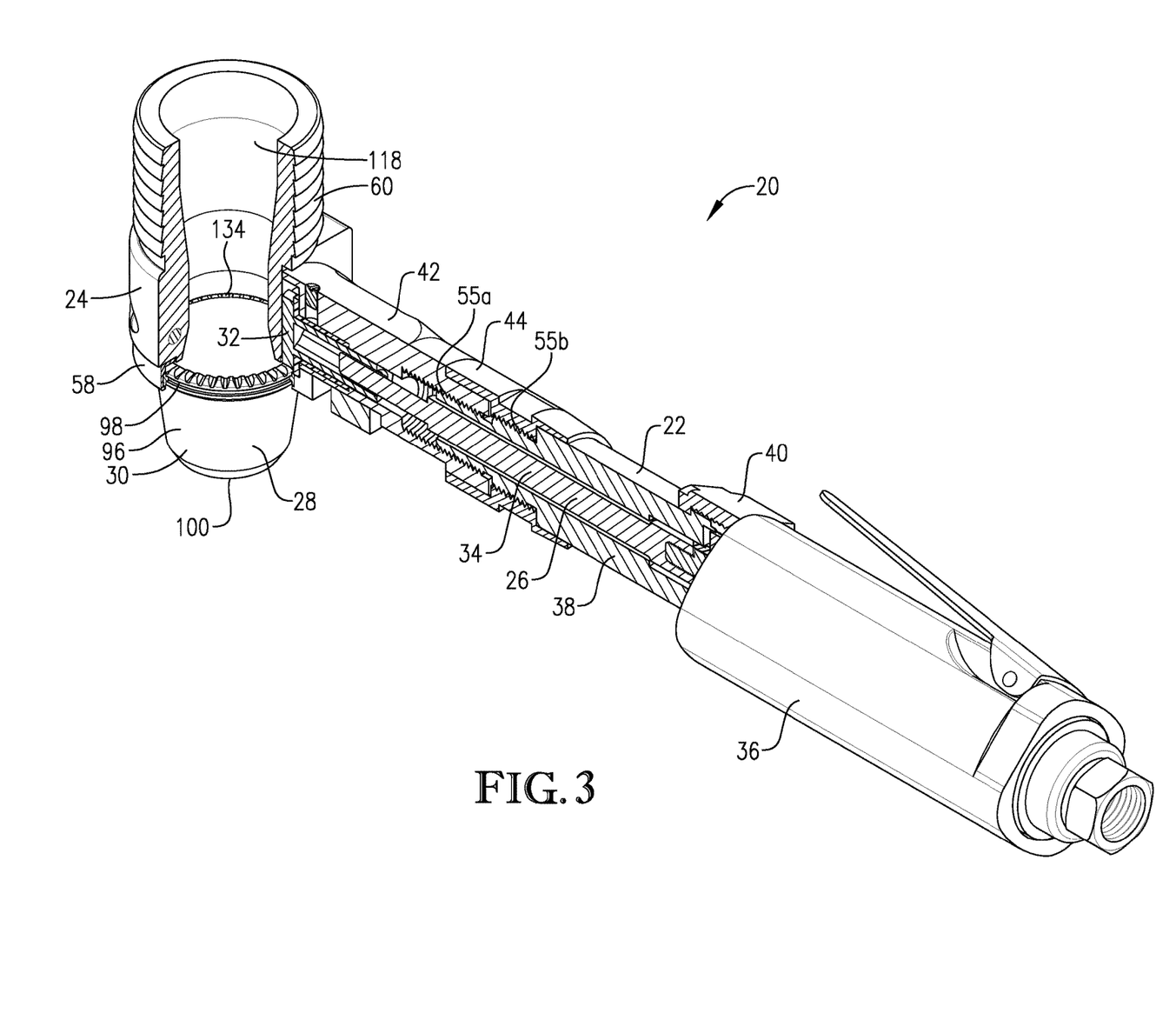
FIG. 3 is an upper perspective of the vacuum rotary knife similar to FIG. 2, but showing the rotary knife partly cross sectioned to depict a shaft and drive pinion of the powered drive mounted within the knife body, and further showing the blade assembly in intermeshing engagement with the drive pinion.
Figure 4:
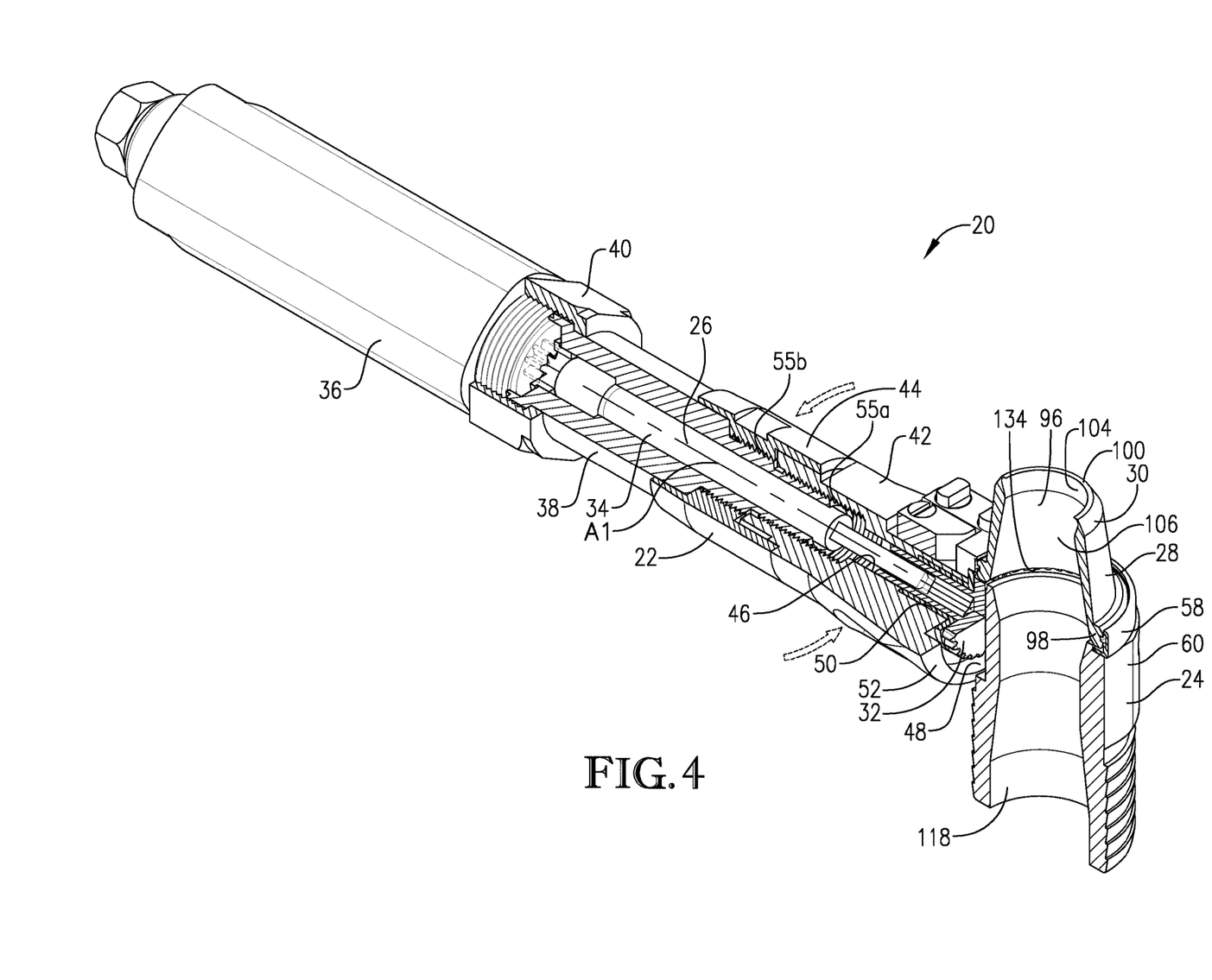
FIG. 4 is a lower perspective of the vacuum rotary knife similar to FIG. 3, but taken from the opposite side of the rotary knife, with the knife body, knife head, and blade assembly being cross sectioned to show the locking collar in engagement with the extension and head support.
Figure 5:
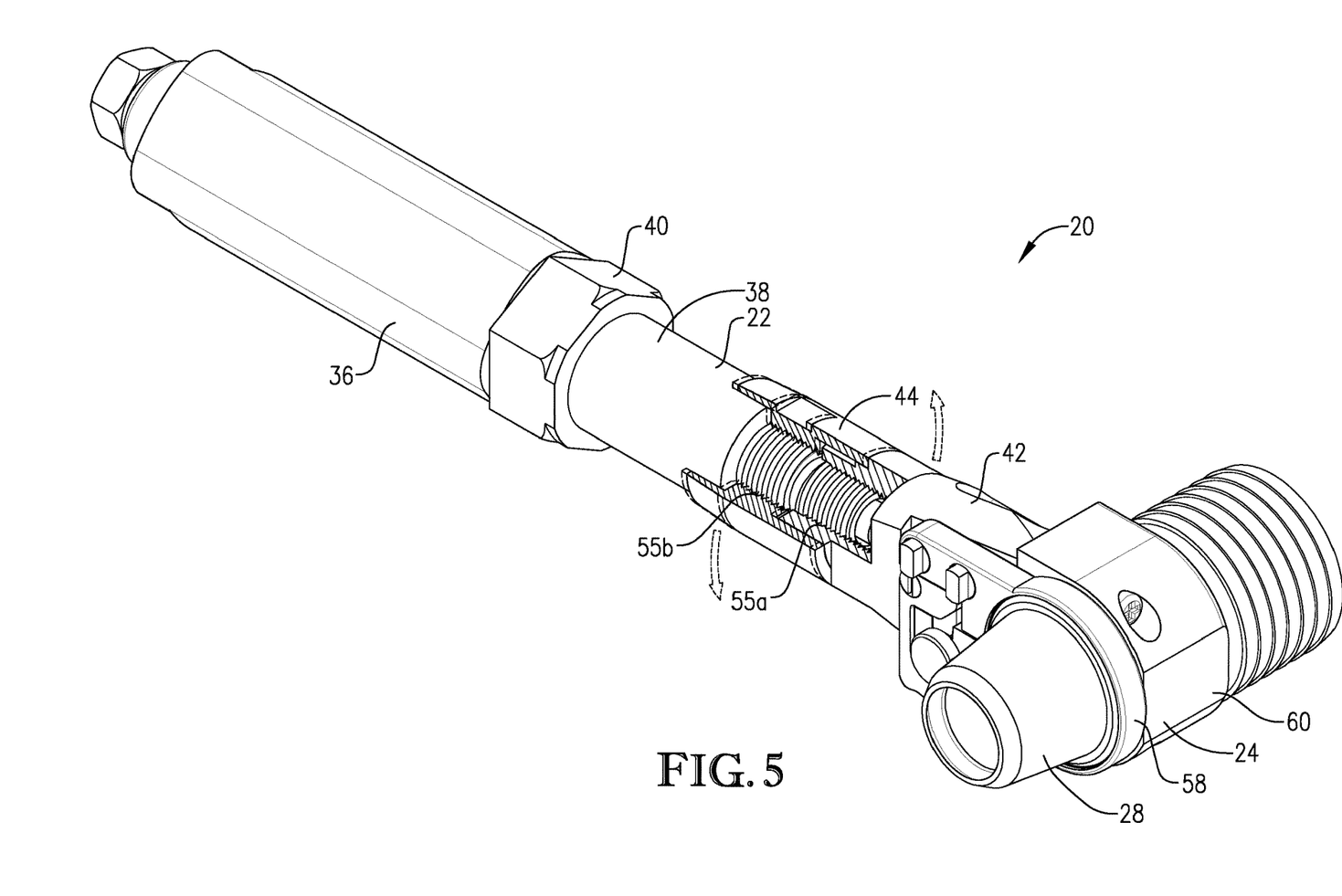
FIG. 5 is a perspective of the vacuum rotary knife similar to FIG. 1, but showing the rotary knife arranged on its side, with part of the knife body being cross sectioned to show the components for adjustably securing the head in a variable angular orientation relative to the knife body.

The extension housing 38 and the lock collar 44 also preferably present male and female threaded sections, respectively, that are threadably connected to each other at a threaded connection 55b (see FIGS. 3-5). The threaded connection 55b permits relative rotation between the extension housing 38 and the lock collar 44 about the axis A1. Furthermore, the threaded connection 55b permits the lock collar 44 to be advanced toward and away from the head support 42. In this manner, the lock collar 44 can be advanced into and out of engagement with the head support 42 where the lock collar 44 is in the locking condition. Again, in the locking condition, the lock collar 44 frictionally engages the head support 42 to restrict relative rotation between the extension housing 38 and the head support 42. That is, the lock collar 44 restricts angular adjustment of the head support 42 relative to the extension housing 38 in the locking condition. However, the lock collar 44 can be selectively moved out of the locking condition to permit angular adjustment of the head support 42.

It is within the ambit of the present invention where knife body 22 is constructed to present an alternative length. For instance, the extension housing 38 could be removed entirely or replaced with an alternative length extension housing to change the length of the knife body 22. In such an alternative configuration, an alternative drive shaft is rotatably mounted within the knife body to transmit torque to the blade assembly while accommodating the alternative knife body length.

Turning to FIGS. 2-4, 6, and 8-12, the knife head 24 is operable to support the blade assembly 28 relative to the knife body 22 and to be connected to a vacuum system via a vacuum source conduit 56. The vacuum system induces air flow F, which is operable to carry severed carcass material through the knife head 24 and into the conduit 56. The vacuum system carries the material through the conduit 56 to a waste collection area (not shown). The knife head 24 preferably includes a blade housing 58 and a conduit connector 60 secured to the head support 42.

The blade housing 58 preferably supports the blade 30 during operation and permits blade rotation. The blade housing 58 preferably comprises a unitary split ring that presents adjacent ring ends 62,64 (see FIG. 6). The split ring also includes an annular section 66 preferably extending continuously between the ends 62,64 to present a generally circular ring opening 68 that receives the blade 30 (see FIGS. 6, 8, and 9). The blade housing 58 presents opposite sides 70,72, a curved outer surface 74, and a curved inner surface 76 (see FIG. 6). The ring ends 62,64 cooperatively present an arcuate relief 78 that receives the pinion 32 and bushing 50 (see FIGS. 6 and 12).

Figures 10, 11:
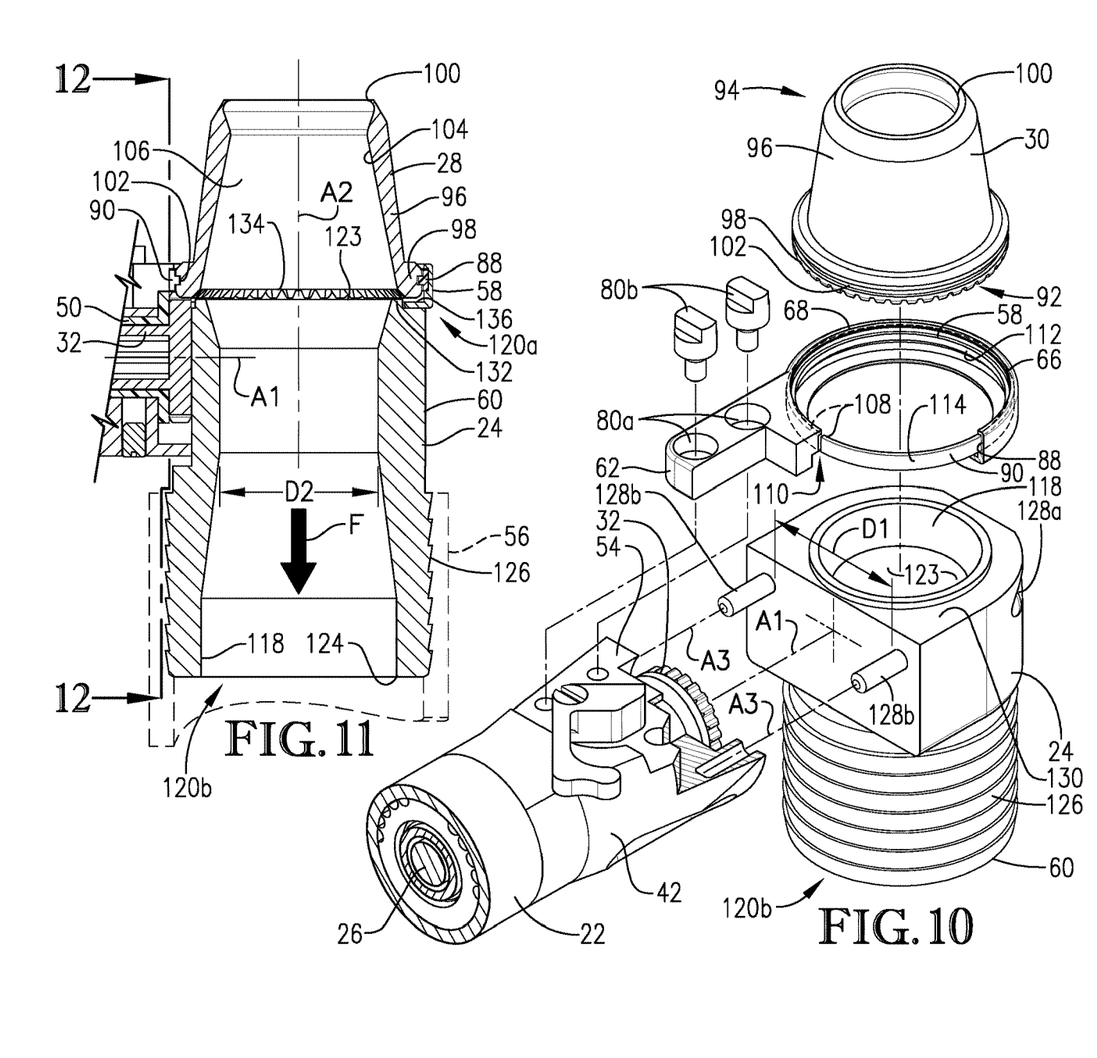
FIG. 10 is a fragmentary perspective of the vacuum rotary knife similar to FIG. 9, but showing the blade housing and conduit connector exploded from the head support.
FIG. 11 is a fragmentary cross section of the vacuum rotary knife shown in FIGS. 1-10, showing the drive pinion in intermeshing engagement with the blade, and further showing a suction pathway extending through the conduit connector between the blade and a vacuum port of the conduit connector.

The ring end 62 presents openings 80a that receive corresponding fasteners 80b to secure the ring end 62 to the head support 42 (see FIG. 10). The ring end 64 presents a slot 82a that slidably receives a bolt 82b mounted on the head support 42 (see FIGS. 8 and 9). When mounted on the head support 42, the split ring is operable to be flexed between a blade-securing condition (see FIGS. 5 and 8), where the blade housing 58 rotatably supports the blade assembly 28, and an open blade-releasing condition (see FIG. 9), where the blade housing 58 permits installation and removal of the blade assembly 28.

The knife head 24 further includes a lever 84 (see FIGS. 8 and 9) that is pivotally mounted to the head support 42 to move the split ring out of the blade-securing condition and into the blade-releasing condition. The lever 84 presents a cam end 86 (see FIG. 9) that engages the ring end 64. The lever 84 is pivotal between an open position (see FIG. 9) and a closed position (see FIG. 8). By pivoting the lever 84 open, the lever 84 urges the blade housing 58 from the blade-securing condition to the blade releasing condition. More particularly, as the lever 84 is opened, the cam end 86 engages the ring end 64 and urges the ring end 64 away from the ring end 62 so that the split ring flexes and the opening 68 is enlarged. In the blade-releasing condition, the enlarged opening 68 permits the blade 32 and blade bushing to be inserted and removed relative to the blade housing 58.

The inner surface 76 defines a single groove 88 that provides a race for supporting the blade assembly 28 (see FIGS. 6 and 8-11). Although the illustrated groove configuration is preferred, the blade housing 58 could have an alternative groove arrangement without departing from the scope of the present invention. For instance, the blade housing 58 could present multiple grooves for engagement with the blade assembly 28.

The blade housing 58 and the knife body 22 are preferably made from a tempered steel to resist oxidation and corrosion. However, it is also within the scope of the present invention where the blade housing 58 and knife body 22 include other metallic or non-metallic materials such as brass, aluminum, or stainless steel.

The blade housing 58 or knife body 22, either entirely or partly, may alternatively include an outermost layer of brass, aluminum, or stainless steel that is suitable for surface-to-surface engagement with the blade assembly 28. In this manner, such an outermost layer, whether coated, adhered, or otherwise secured onto the base material, may provide an optimal surface for low-friction bearing engagement with the blade assembly 28. However, the outermost layer may be included for other purposes, such as corrosion resistance, aesthetic qualities, or other performance requirements.

Various aspects of the blade housing design could be alternatively configured without departing from the scope of the present invention. For instance, the blade housing could be modified to accommodate a relatively larger rotary blade. Details of such an alternative blade housing design with a split-ring housing and a pivotal lever are disclosed in U.S. Pat. No. 8,893,391, issued Nov. 25, 2014, entitled ROTARY KNIFE WITH MECHANISM FOR CONTROLLING BLADE HOUSING, which is hereby incorporated in its entirety by reference herein.

Turning to FIGS. 9-12, the blade assembly 28 preferably includes the annular blade 30 and an annular bushing 90.

Figure 12:
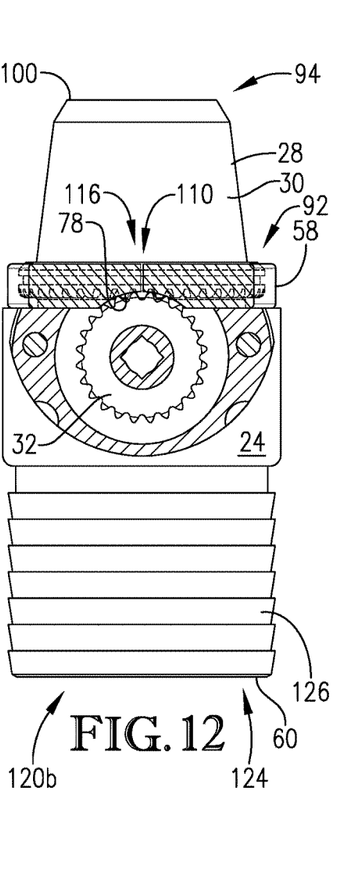
FIG. 12 is a fragmentary cross section of the vacuum rotary knife taken along line 12-12 in FIG. 11, showing the pinion mounted in the head support and located adjacent the blade housing.

The blade 30 has a unitary construction that presents axially opposite blade ends 92,94 (see FIGS. 10 and 12). The blade is substantially continuous around its circumference. The blade 30 also includes a blade wall 96 and an integrally formed ring gear 98 (see FIGS. 3, 4, 10, and 11). The ring gear 98 extends from the blade wall 96 at the blade end 92 for mating engagement with the pinion 32. The blade end 94 of the blade wall 96 preferably presents a sharp cutting edge 100.

For some aspects of the present invention, the blade 30 could be alternatively configured to include other types of edges. For example, instead of the sharp edge 100, the blade could alternatively include an abrasive edge (e.g., with a surface that is gritted), a serrated edge, or a brush-type shredding edge.

The blade end 92 presents an endless groove 102 to receive the bushing 90 (see FIGS. 10 and 11). It is also consistent with the principles of the present invention for the blade 30 to include multiple grooves (e.g., for engagement with multiple bushing segments). The groove 102 may include other alternative features without departing from certain aspects of the present invention.

The blade 30 is preferably manufactured from tempered steel. However, similar to the blade housing 58 and knife body 22, the principles of the present invention are applicable where the blade 30 includes other metallic or non-metallic materials, such as brass, aluminum, or stainless steel. The blade, either entirely or partly, may include an outermost layer of brass, aluminum, or stainless steel that is suitable for surface-to-surface engagement with the bushing 90. In this manner, such an outermost layer, whether coated, adhered, or otherwise secured onto the base material, may provide an optimal surface for low-friction bearing engagement. However, the outermost layer may be included for other purposes, such as corrosion resistance, aesthetic qualities, or other performance requirements.

The blade wall 96 extends axially from the ring gear 98 to the cutting edge 100 and presents an inner blade surface 104 that defines a blade passage 106 (see FIGS. 4 and 11). The blade surface 104 extends endlessly about the blade passage 106 and extends continuously from the ring gear 98 to the cutting edge 100. However, for some aspects of the present invention, the blade surface could present one or more openings located between the ring gear and the cutting edge.

The blade wall 96 presents an outer surface that preferably tapers radially inward in the direction of the cutting edge. However, the blade could have an alternative shape without departing from the scope of the present invention. For instance, the outer surface of the blade wall could present a shape that tapers outwardly, is generally straight, or is curvilinear.

Figures 8, 9:
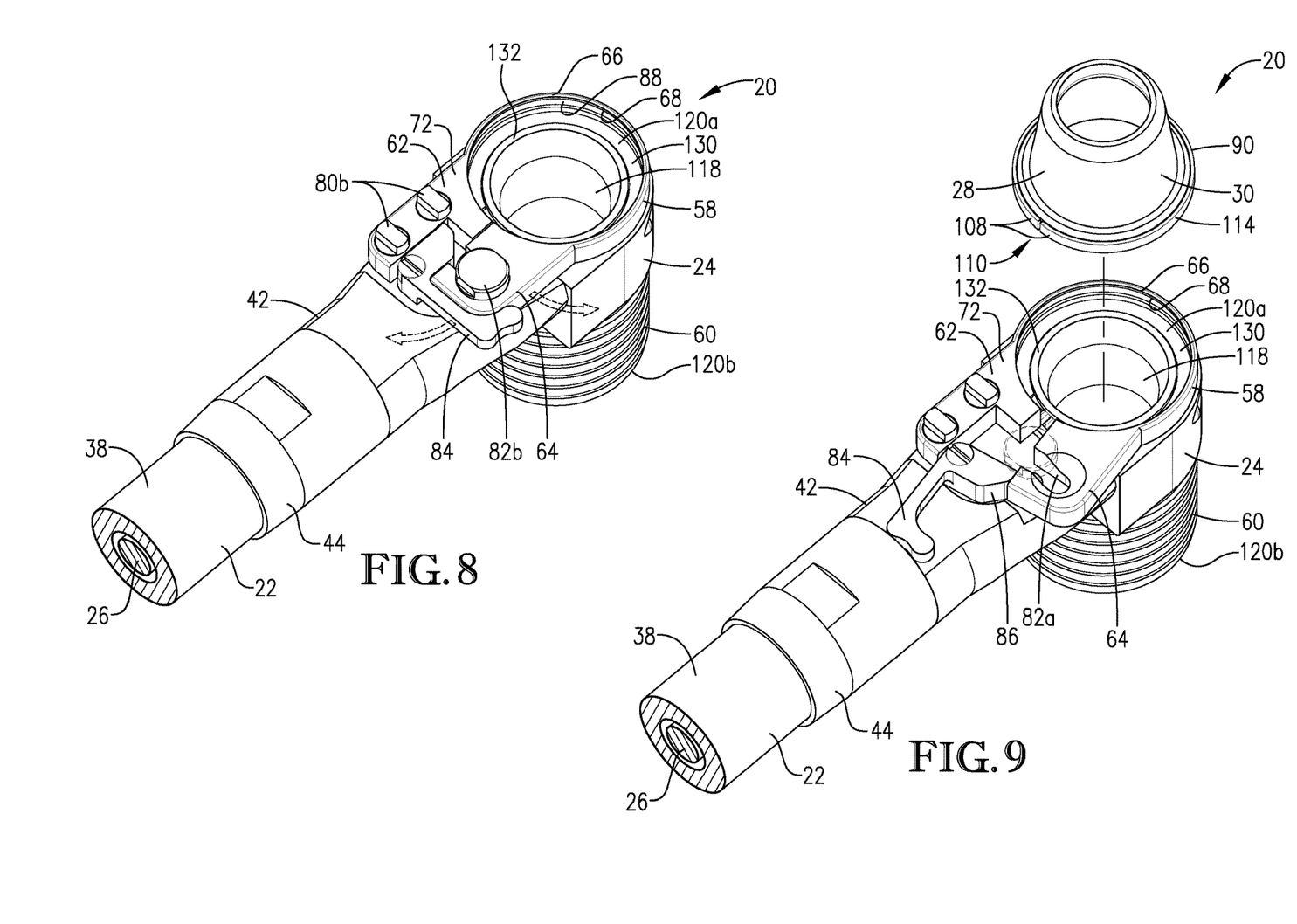
FIG. 8 is a fragmentary perspective of the vacuum rotary knife shown in FIGS. 1-7, showing the blade assembly removed from the knife head to depict a ring opening of the blade housing, with the blade housing in a blade-securing condition.
FIG. 9 is a fragmentary perspective of the vacuum rotary knife similar to FIG. 8, but showing the blade housing in a blade-releasing condition where the ring opening is relatively enlarged to permit connection and removal of the blade assembly.

The bushing 90 is preferably unitary and includes an annular body with bushing ends 108 (see FIGS. 9 and 10). The ends 108 are located adjacent to each other preferably such that the annular body forms an essentially endless bearing surface. The principles of the present invention are also applicable where the body is in fact endless. The body preferably has an outermost diameter of between about 0.5 to 5 inches, although other sizes are entirely within the ambit of the present invention. If desired, the ends 108 may define a gap 110 therebetween (see FIGS. 9 and 10). The bushing 90 is generally dimensioned and constructed so that it is operable to deform elastically during installation between the blade 30 and blade housing 58.

The illustrated bushing 90 presents an inner perimeter surface 112 and an outer perimeter surface 114 (see FIGS.

9-11). The illustrated inner perimeter surface 112 includes shoulders that define an annular interior rib. The outer perimeter surface 114 includes a generally flat profile. However, other bushing shapes and designs are entirely within the ambit of the present invention. That is, the principles of the present invention are also applicable where the surfaces 102,104 include alternative convex or concave profiles. Moreover, the principles of the present invention are also applicable to a bushing with multiple segments. For example, an alternative bushing could include a plurality of substantially circular segments that are spaced relative to each other (e.g., concentrically spaced, and/or axially spaced). Alternatively, the bushing 90 may include arcuate segments arranged in series in a substantially circular form. The principles of the present invention are further applicable where the bushing includes a bearing other than a journal bearing, such as a ball bearing.

The bushing 90 preferably includes an ABS plastic or an Acetal plastic such as Delrin®. However, the principles of the present invention are also applicable where the bushing 90 is constructed from plastic, other non-metallic materials, or metallic materials suitable for use in a bushing application. For example, the bushing 90, either entirely or partly, may include an outermost layer of brass, aluminum, or stainless steel that is suitable for surface-to-surface engagement with the blade 30 and blade housing 58. In this manner, such an outermost layer, whether coated, adhered, or otherwise secured onto the base material (e.g., plastic), may provide an optimal surface for low-friction bearing engagement. However, the outermost layer may be included for other purposes, such as corrosion resistance, aesthetic qualities, or other performance requirements.

Figure 6:
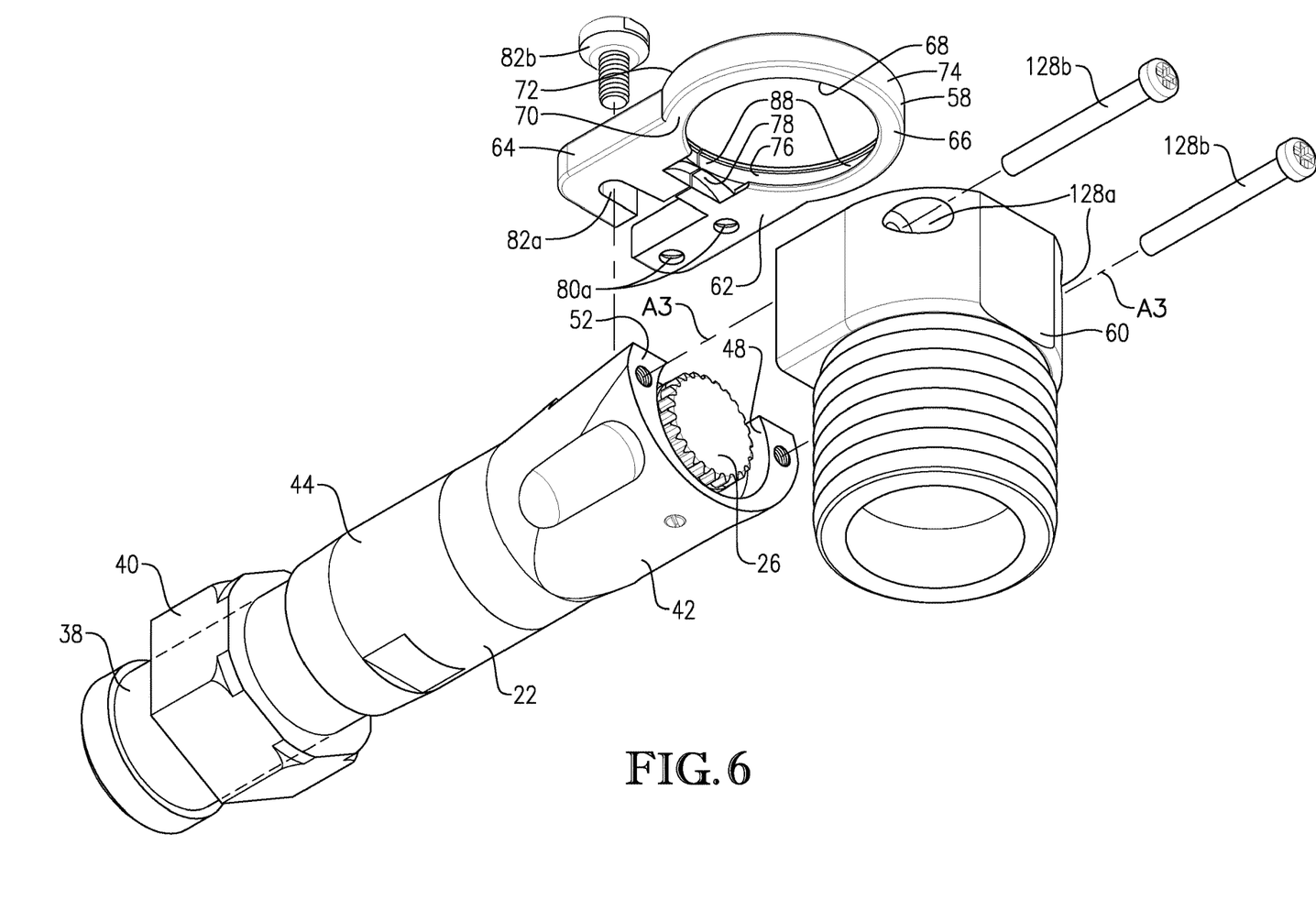
FIG. 6 is an enlarged fragmentary perspective of the vacuum rotary knife shown in FIGS. 1-5, showing a blade housing and conduit connector of the knife head exploded from the knife body.
Figure 7:
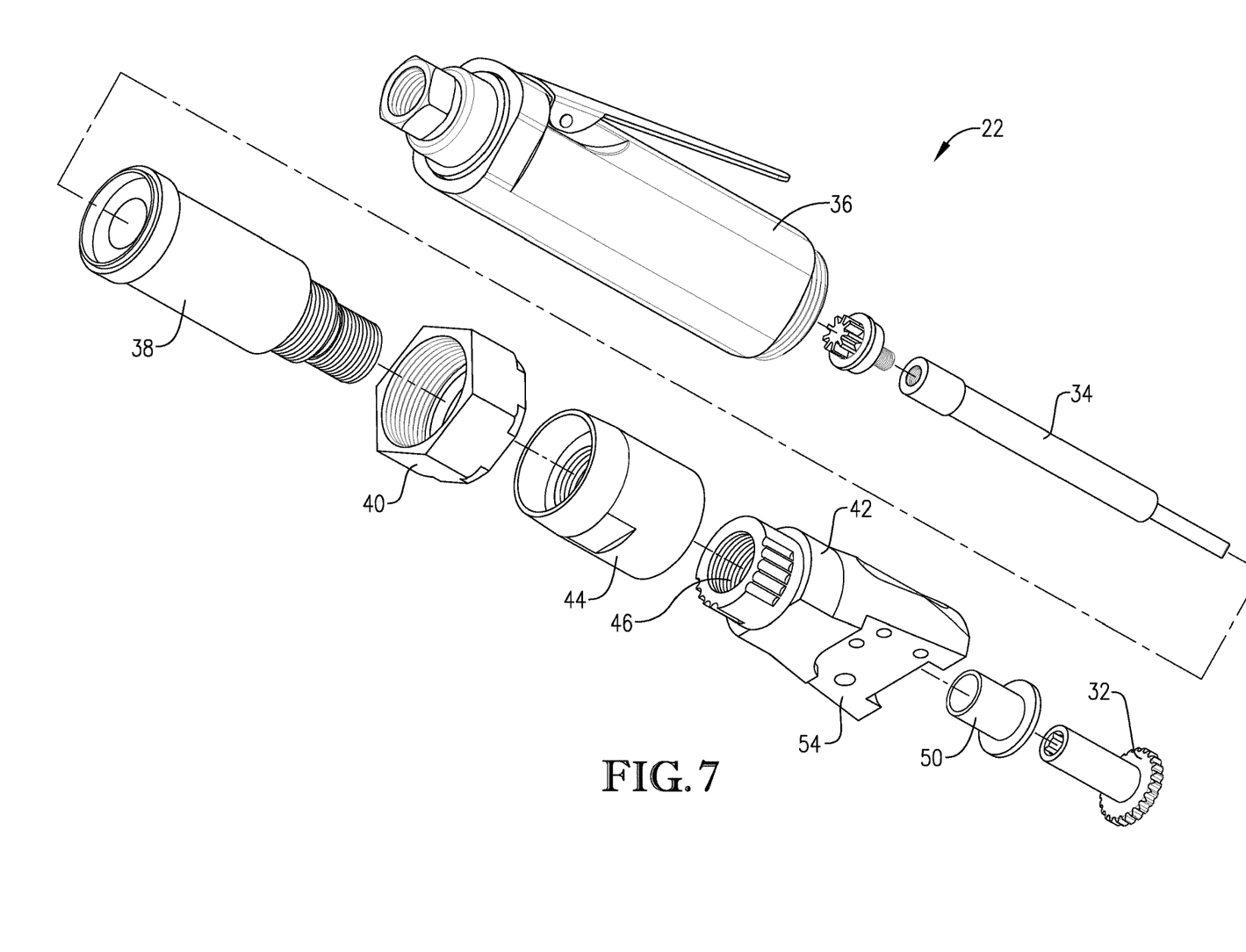
FIG. 7 is an exploded perspective of several of the components of the vacuum rotary knife shown in FIGS. 1-6.

Turning to FIGS. 5-7, when the bushing 90 is received within the outer groove 102, the interior rib of the bushing 90 is spaced within and is configured to substantially conform to the shape of the outer groove 102. The ends 108 are normally spaced adjacent to each other with the small gap 110 remaining therebetween. Thus, the bushing 90 provides a substantially continuous circumference or bearing surface.

Prior to assembling the blade assembly 28 with the blade housing 58, the blade housing 58 is shifted from the blade-securing condition to the blade-releasing condition to allow insertion of the blade assembly. As discussed, the lever 84 is opened to urge the ring end 64 away from the ring end 62 and to thereby enlarge the opening 68.

The blade assembly 28 is assembled onto the blade housing 58 by inserting the bushing 90 into the groove 88. Insertion of the split bushing 90 occurs by initially placing one of the ends 108 into the groove 88, which may require slight deformation of the bushing 90. Subsequently, the remainder of the bushing 90 may be placed within the groove 88 by progressively inserting portions of the bushing 90 along the circumferential direction. When the bushing 90 is received within the groove 88, the outer perimeter surface 114 is located within and is configured to substantially conform to the shape of the groove 88.

The blade 30 is mounted within the blade housing 58 by first aligning the gap 110 of the bushing 90 with a housing gap 116 defined between ends 62,64 (see FIG. 12). In this orientation, the blade housing 58 and bushing 90 are configured to be simultaneously and elastically deformed in an outward direction to expand in diameter, thus increasing the size of the gaps 110,116. This expansion permits the blade 30 to be placed therein, with the groove 88 being placed into an opposed relationship with the groove 102 (where "opposed relationship" is defined herein as the grooves 88,102 facing in opposite directions). Moreover, the illustrated grooves 88,102 are oppositely spaced from each other (with "oppositely spaced" defined herein as the grooves 70,96 being in opposed relationship and directly facing each other, i.e., not offset from each other along the blade axis). Again, the principles of the present invention are applicable where the grooves 88,102 are in opposed relationship to each other. For example, an alternative pair of circular grooves may have a common axis but be offset from each other along the axis. Those of ordinary skill in the art will appreciate that the bushing 84 may alternatively be first placed on the blade 30, and then the assembled blade assembly 28 positioned within the blade housing 58, without departing from the spirit of the present invention.

When the blade assembly 28 is installed, the blade 30 is operable to rotate about a blade axis A2 (see FIG. 11). The drive pinion 32 is preferably mounted in driving intermeshing engagement with the ring gear 88 of the annular blade 30 and rotates about the drive axis A1. Thus, as the drive pinion 32 rotates about the blade axis A2, rotation of the drive pinion 32 imparts rotation to the blade 30, which rotates about the blade axis A2. In the illustrated embodiment, the blade axis A2 is generally perpendicular to the drive axis A1, although the knife 20 could be alternatively configured so that the axes A1,A2 define an alternative angular arrangement.

Turning to FIGS. 8-12, the conduit connector 60 defines a suction pathway 118 to carry severed carcass material from the blade passage 106 to the vacuum system. The illustrated conduit connector 60 preferably extends endlessly about the suction pathway 118 so that the suction pathway 118 is at least substantially devoid of any openings along the length of the conduit connector 60.

The illustrated connector 60 comprises a unitary sleeve and presents opposite proximal and distal connector ends 120a,b and an inner surface 122. The inner surface 122 preferably extends continuously between the connector ends 120a,b to define the suction pathway 118. However, it will be appreciated that the suction pathway could be defined cooperatively by the connector and one or more other components.

In the illustrated embodiment, the proximal connector end 120a defines a proximal end of the knife head 24 and presents a pathway inlet 123 into the suction pathway 118 (see FIGS. 10 and 11). The distal connector end 120b presents a vacuum port 124 (see FIGS. 11 and 12). The connector 60 also presents an outer connector surface 126. The outer surface 126 preferably defines corrugations adjacent the distal connector end 120b to engage the conduit 56. The corrugations are configured to facilitate sealing and a secure connection between the connector 60 and the conduit 56. The suction pathway 118 preferably extends between the proximal connector end 120a and the vacuum port 124.

The vacuum source conduit 56 is configured to be mounted in sealing engagement with the outer connector surface 126 so that the conduit 56 is in fluid communication with the vacuum port 124 and the suction pathway 118. The conduit 56 is preferably secured to the conduit connector 60 with a metal band (not shown) that compresses the conduit 56 onto the connector surface 126. The conduit 56 sealingly engages the connector surface 126 to prevent air from leaking between the conduit 56 and the connector surface 126.

The conduit connector 60 also presents fastener-receiving holes 128a that each receive a corresponding fastener 128b (see FIGS. 6 and 10). The holes 128a are preferably spaced laterally outside the suction pathway so that the holes 128a do not intersect the inner surface 122. That is, the illustrated holes 128*a* preferably do not intersect the suction pathway 118 so that additional openings (beyond the pathway inlet 123 and the vacuum port 124) along the suction pathway are avoided.

The fasteners 128*b* cooperatively secure the connector 60 to the head support 42. Each fastener 128*b* is shifted along a fastener axis A3 (see FIG. 10) and extends through a corresponding hole 128*a*. Each fastener 128*b* is secured in threaded engagement with the head support 42.

The fasteners 128*b* are preferably positioned so that each fastener axis A3 is spaced outside the suction pathway 118. The fasteners 128*b* cooperatively define a spacing dimension D1 (see FIG. 10) greater than an internal diameter dimension D2 (see FIG. 11) of the pathway 118 adjacent the fasteners 128*b*. In the illustrated embodiment, the dimension D2 varies along the length of the connector 60, although the connector 60 could be alternatively configured. As shown, the dimension D2 is relatively larger at some locations (e.g., adjacent the distal end 120*b*) spaced axially from the fasteners 128*b* (see FIG. 11).

When secured to the head support 42, the conduit connector 60 preferably serves as a pinion-covering portion of the knife head 24. The connector 60 preferably spans the socket 48 and generally covers the pinion 32 to restrict access to the pinion 32 when the connector 60 is secured to the head support 42.

The connector end 120*a* preferably includes an end face 130 and a circular rim 132 that projects normally from the end face 130 (see FIGS. 8-11). When securing the blade housing 58 and connector 60 to the head support 42, the connector 60 preferably engages the blade housing 58 so that the rim 132 is inserted within the ring opening 68 and the end face 130 engages the side 70 of blade housing 58 (see FIG. 11).

The blade housing 58 and connector 60 are generally in tight sealing engagement with one another to restrict air from passing therebetween. Because the split ring of the blade housing 58 presents a small gap 116, the gap 116 might permit a relatively small air flow to pass therethrough.

The blade end 92 and the proximal head end are located adjacent one another and cooperatively define a blade/head interface 134 (see FIG. 11). More particularly, the teeth of the ring gear 98 and the connector end 120*a* cooperatively define the interface 134, which forms a single annular opening. The interface 134 is preferably the only opening between the cutting edge 100 and the vacuum port 124. The illustrated arrangement of the blade 30, the blade housing 58, and the connector 60 serves to minimize and, more preferably, substantially prevent air flow through the blade/head interface 134.

The blade 30, blade housing 58, and blade bushing 90 cooperatively define an annular interior space 136 (see FIG. 11). The interior space 136 fluidly communicates with the suction pathway 118 via the interface 134 and inlet 123. However, the size of the interior space 136 is preferably minimized to restrict the flow of air through the space 136 and through the interface 134. When the blade 30, blade bushing 90, and blade housing 58 are secured for operation, the tight sliding fit between the blade 30 and blade bushing 58 is configured to restrict air flow into and out of the interior space 136. Similarly, the tight sliding fit between the blade bushing 90 and blade housing 58 also preferably restricts air flow into and out of the interior space 136.

In use, the rotary knife 20 is powered by the motor so that rotation of the drive shaft 34 and pinion 32 imparts rotation to the blade 30. As the blade 30 rotates and is used to sever carcass material, the vacuum system induces a suction air flow into the knife head 24 via the blade passage 106. This air flow serves to draw severed carcass material through the suction pathway 118 and into the conduit 56.

The blade assembly 28 can be selectively removed and installed (e.g., for maintenance or replacement) by moving the blade housing 58 between the blade-securing condition and the blade-releasing condition. The blade housing 58 is opened by moving the lever 84 from the closed position to the open position. As the lever 84 is opened, the cam end 86 engages the ring end 64 and urges the ring end 64 away from the ring end 62 so that the opening 68 is enlarged. In the blade-releasing condition, the enlarged opening 68 permits the blade 30 and blade bushing 90 to be inserted and removed relative to the blade housing 58. The lever 84 can be selectively closed to return the blade housing 58 to the blade-releasing condition.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A vacuum rotary knife fluidly connectable to a vacuum source conduit, said rotary knife comprising:
   an annular blade;
   a knife head supporting the blade for rotation about a rotational axis,
   said knife head presenting a vacuum port fluidly connectable to the conduit,
   said vacuum port being spaced from the blade such that the knife head defines a suction pathway extending between the blade and the vacuum port,
   said suction pathway being at least substantially devoid of any openings;
   a knife body;
   a plurality of first fasteners securing the knife head to the knife body,
   each of said first fasteners presenting a fastener axis along which the first fastener shifts when securing the knife head to the knife body,
   said first fasteners being located such that the fastener axes are spaced outside the suction pathway;
   a drive pinion rotatable supported on the knife body,
   said blade including a ring gear that intermeshes with the pinion so that rotation of the pinion imparts rotation to the blade,
   said knife head having a pinion-covering portion that overlies at least part of the pinion, said knife head including a blade housing and a conduit connector, said blade housing rotatably supporting the blade, said conduit connector defining the vacuum port, said conduit connector defining the pinion-covering portion of the knife head, said conduit connector including a plurality of fastener-receiving holes, each of which receives a corresponding one of the first fasteners, said blade housing comprising a split ring that presents adjacent ring ends, said split ring presenting a generally circular ring opening that rotatably receives the blade, with the split ring operable to be flexed to move the ring ends apart and thereby enlarge the ring opening, said conduit connector comprising a sleeve that extends endlessly about the suction pathway and presents a continuous inner surface that at least partially defines the suction pathway; and a plurality of second fasteners securing the blade housing to the knife body, with the conduit connector being secured to the knife body by the first fasteners.

2. The vacuum rotary knife as claimed in claim 1, said blade including axially opposite first and second blade ends, with the first blade end defining a cutting edge, said knife head presenting a proximal head end spaced from the vacuum port, said second blade end and said proximal head end being adjacent one another to define a blade/head interface, said blade/head interface being the only opening between the cutting edge and the vacuum port.

3. The vacuum rotary knife as claimed in claim 2, said conduit connector including opposite proximal and distal connector ends, with the continuous inner surface extending between the connector ends.

4. The vacuum rotary knife as claimed in claim 3, said proximal connector end defining the proximal head end, said vacuum port being defined at the distal connector end.

5. The vacuum rotary knife as claimed in claim 1, said conduit connector including opposite proximal and distal connector ends, with the continuous inner surface extending between the connector ends, said fastener-receiving holes being spaced outside the inner surface.

6. The vacuum rotary knife as claimed in claim 1, said suction pathway defining a cross-sectional dimension, said first fasteners being spaced apart a distance greater than the cross-sectional dimension of the pathway.

7. The vacuum rotary knife as claimed in claim 1, said knife body defining an elongated grasping handle presenting opposite body ends, said knife head being located adjacent one of the body ends.

8. A vacuum rotary knife fluidly connectable to a vacuum source conduit, said rotary knife comprising:

a knife body;

an annular blade;

a knife head supporting the blade on the knife body for rotation about a rotational axis, said knife head presenting a vacuum port fluidly connectable to the conduit, said vacuum port being spaced from the blade such that the knife head defines a suction pathway extending between the blade and the vacuum port;

a plurality of first fasteners securing the knife head to the knife body, each of said first fasteners presenting a fastener axis along which the first fastener shifts when securing the knife head to the knife body, said first fasteners being located such that the fastener axes are spaced outside the suction pathway;

a drive pinion rotatably supported on the knife body, said blade including a ring gear that intermeshes with the pinion so that rotation of the pinion imparts rotation to the blade, said knife head having a pinion-covering portion that overlies at least part of the pinion, said knife head including a blade housing and a conduit connector, said blade housing rotatably supporting the blade, said conduit connector defining the vacuum port, said conduit connector defining the pinion-covering portion of the knife head, said conduit connector including a plurality of fastener-receiving holes, each of which receives a corresponding one of the first fasteners, said blade housing comprising a split ring that presents adjacent ring ends, said split ring presenting a generally circular ring opening that rotatably receives the blade, with the split ring operable to be flexed to move the ring ends apart and thereby enlarge the ring opening, said conduit connector comprising a sleeve that extends endlessly about the suction pathway and presents a continuous inner surface that at least partially defines the suction pathway; and a plurality of second fasteners securing the blade housing to the knife body, with the conduit connector being secured to the knife body with the first fasteners.

9. The vacuum rotary knife as claimed in claim 8, said blade including axially opposite first and second blade ends, with the first blade end defining a cutting edge, said knife head presenting a proximal head end spaced from the vacuum port, said second blade end and said proximal head end being adjacent one another to define a blade/head interface, said blade/head interface being the only opening between the cutting edge and the vacuum port.

10. The vacuum rotary knife as claimed in claim 9, said conduit connector including opposite proximal and distal connector ends, with the continuous inner surface extending between the connector ends.

11. The vacuum rotary knife as claimed in claim 10, said proximal connector end defining the proximal head end, said vacuum pert being defined at the distal connector end.

12. The vacuum rotary knife as claimed in claim 8, said conduit connector including opposite proximal and distal connector ends, with the continuous inner surface extending between the connector ends, said fastener-receiving holes being spaced outside the inner surface.

13. The vacuum rotary knife as claimed in claim 8, said suction pathway defining a cross-sectional dimension, said first fasteners being spaced apart a distance greater than the cross-sectional dimension of the pathway.

14. The vacuum rotary knife as claimed in claim 8,
said knife body defining an elongated grasping handle presenting opposite body ends,
said knife head being located adjacent one of the body ends.

* * * * *